United States Patent vom Schwemm et al.

[11] Patent Number: 5,476,270
[45] Date of Patent: Dec. 19, 1995

[54] SHAFT SEAL AND GASKET ASSEMBLY

[75] Inventors: Michael vom Schwemm, Kiel; Carl-Joseph Testroet, Hoisdorf; Jürgen Hering, Sievershütten; Gerd Upper, Hoisdorf; Siegfried Flossmann, Neuendorf, all of Germany

[73] Assignee: Dichtungstechnik G. Bruss GmbH & Co. KG, Hoisdorf/Hamburg, Germany

[21] Appl. No.: 209,760

[22] Filed: Mar. 11, 1994

[30] Foreign Application Priority Data

Mar. 12, 1993 [EP] European Pat. Off. ............. 93104038

[51] Int. Cl.$^6$ ........................................... F16J 15/10
[52] U.S. Cl. ............................... 277/35; 277/11; 277/181
[58] Field of Search ............................... 277/35, 37, 11, 277/152, 153, 134, 203, 204, 181, 182

[56] References Cited

U.S. PATENT DOCUMENTS

| | | | |
|---|---|---|---|
| 3,241,845 | 3/1966 | Smith et al. | 277/182 |
| 4,436,310 | 3/1984 | Sawabe et al. | 277/11 |
| 4,484,751 | 11/1984 | Deuring | 277/214 |
| 5,123,661 | 6/1992 | Johnston et al. | 277/153 |
| 5,308,087 | 5/1994 | Schmitt | 277/35 |

FOREIGN PATENT DOCUMENTS

| | | | |
|---|---|---|---|
| 0139503 | 10/1984 | European Pat. Off. | |
| 0632259 | 6/1936 | Germany | 277/35 |
| 3634735 | 4/1988 | Germany | |

Primary Examiner—Daniel C. DePumpo
Attorney, Agent, or Firm—Lawrence J. Shurupoff

[57] ABSTRACT

A seal assembly for a shaft extending out of a casing and, in particular, the crankshaft received in the crankcase of a motor vehicle includes a gasket receptacle in the form of a metal die casting having a passage opening for the shaft. A dynamic shaft seal ring is inserted in the passage opening of the gasket receptacle and a static gasket separate from the shaft seal ring and made from the same elastomer material as the ring is located on the side of the receptacle facing the casing. The shaft seal ring and the static gasket are moulded from the same side and in one operation onto the gasket receptacle.

3 Claims, 5 Drawing Sheets

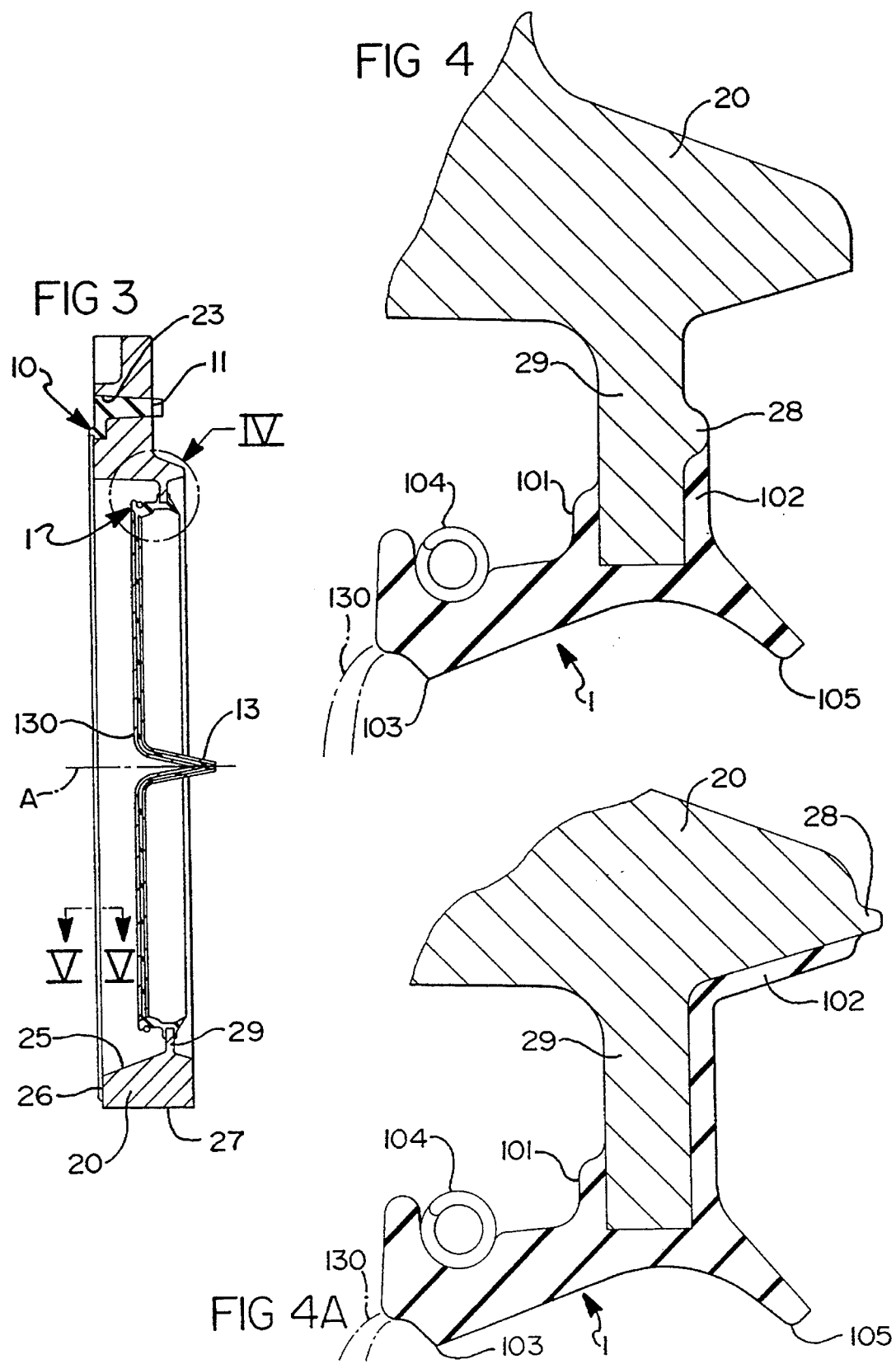

SHAFT SEAL AND GASKET ASSEMBLY

BACKGROUND OF THE INVENTION

FIELD OF THE INVENTION

In the exploded view of FIG. 1 it is possible to see the construction of a shaft seal for the output end of a crankshaft of a motor vehicle, such as is used at present according to the prior art.

The essential parts of this crankshaft seal are a radial shaft seal ring 1, a gasket receptacle 2 in the form of an aluminium pressure die casting 20 with a passage opening 21 for a crankshaft 7, a flat gasket 3 for sealing the gasket receptacle 2 with respect to the end wall 62 of the crankcase 6, an oil pan or sump 8 with a gasket 5, which projects over the end wall 62 of the crankcase 6, so that an underface 27 of the gasket receptacle 2 can sealingly engage against the same.

The manufacture of such a shaft seal requires four working steps:

pressing the raial shaft seal ring 1 into the gasket receptacle 2, assembly of the flat gasket 3, application of a pasty sealant between the end face of the flat gasket 3 and the oil sump gasket 5, assembly of the gasket receptacle 2 with the preassembled radial shaft seal ring 1 on the end face 62 of the engine block 6 by screwing.

Such a multipart solution leads to numerous fault and error possibilities with respect to the:

Radial shaft seal ring 1:

damage during packing, transportation, unpacking and preassembly, tilting during pressing in, confusion with respect to the fitting position (spring-loaded sealing lip pointing outwards instead of inwards), leaks on the external diameter;

Gasket receptacle 2:

damage in the bore into which the radial shaft seal ring is pressed, damage, e.g. scratches, on the sealing face to the flat gasket 3, damage, e.g. scratches on the sealing face 26 to the oil sump gasket 5, opening of pores during the machining of the gasket receptacle 2;

Flat gasket 3:

damage during packing, transportation, unpacking and preassembly, dimensional tolerances, the pasty sealant between the end face of the flat gasket 3 and the oil sump gasket 5 (necessary for tolerance compensation purposes) can either be forgotten or incorrectly applied.

DE 36 34 735 C2 discloses a crankshaft seal, in which a shaft seal ring and a static gasket are moulded onto a gasket receptacle in the form of a cup-shaped sheet metal body. For this purpose grooves and connecting channels are provided in the sheet metal body between the dynamic shaft seal ring and the static gasket and through them the elastomeric material flows during moulding from the mould cavity for one gasket to that of the other gasket.

During such a moulding process there is a non-uniform pressure build-up during the filling of the mould cavity for the sealing lip of the dynamic shaft seal ring at the overflow channel to the static gasket, so that it is not possible to ensure the absolutely faultless construction in the vicinity of the sealing edge which is indispensable for satisfactory operation.

EP 139 503 B1 discloses a shaft seal, in which a shaft seal ring and a static gasket are separately shaped onto a gasket receptacle and then the latter forms together with the moulded gaskets a replaceable unit. In this construction the static gasket only provides a seal to the end face of the crankcase and not to the oil sump.

The problem of the invention is to provide a method for the manufacture of a shaft gasket, which is as far as possible based on the proven construction according to FIG. 1, where manufacture has the same process reliability, but assembly is more reliable and less expensive, also with a view to minimum machining of the casting forming the gasket receptacle. This problem is solved by a method according to the present invention.

SUMMARY OF THE INVENTION

In the method according to the invention the static gasket and the shaft seal ring are not so moulded by a common runner or sprue, that the mould cavities are successively filled by connecting channels with the elastomeric sealing material and are instead simultaneously filled separately from one another in a single operation by means of individual runner points of the two gaskets, which leads to a perfect moulding of the two gaskets with a faultless moulding of the sealing edge of the shaft seal ring. As the new shaft seal prefabricated as a separate module scarcely diverges with regards to the vibration behaviour and thermal expansion from the prior art shaft seal, the existing findings essentially also apply to the novel shaft seal, which greatly simplifies testing by the vehicle manufacturer and allows an expectation of at least the same reliability in operation.

An important advantage is that it is possible to use without changes the existing and largely automated assembly means.

According to an advantageous development of the method according to the invention the static gasket is moulded by one or more spot runners and the shaft seal ring by means of a ring duct or shield with central moulding to the gasket receptacle using a single injection mould with multiple nozzles. It is possible to mould from both sides of the gasket receptacle, but the invention gives preference to moulding on the side facing the casing.

Advantageously fitting elements linked with the static gasket are also moulded for adapting the gasket receptacle to the casing.

In a particularly important embodiment of the shaft seal, the arrangement is such that the static gasket seals with a first portion with respect to the casing and with a second portion with respect to the oil sump seal, without in the preassembly state the static gasket projecting towards the oil sump-side, second face of the gasket receptacle. Instead, the static gasket portion towards the oil sump-side seal, only at the time of assembly is displaced beyond the gasket receptacle face downwards against the oil sump seal.

A mechanical machining of the die casting is only necessary at the second face, in order to maintain the necessary small tolerance between the shaft axis and the underside of the engine block or crankcase to which the oil sump is to be fitted in a sealed manner.

BRIEF DESCRIPTION OF DRAWINGS

The invention is described in greater detail hereinafter relative to further details and the attached drawings, wherein:

FIG. 3 A section through a shaft seal according to the invention during the moulding of a shaft seal ring and a separate static gasket.

FIG. 4 A partial section through an embodiment of the shaft seal ring at IV in FIG. 3, FIG. An alternate embodiment of FIG. 4.

In FIG. 2 identical and identically acting parts to those of FIG. 1 are given the same reference numerals.

DETAILED DESCRIPTION OF THE PREFERRED EMBODIMENTS

Figure 1:
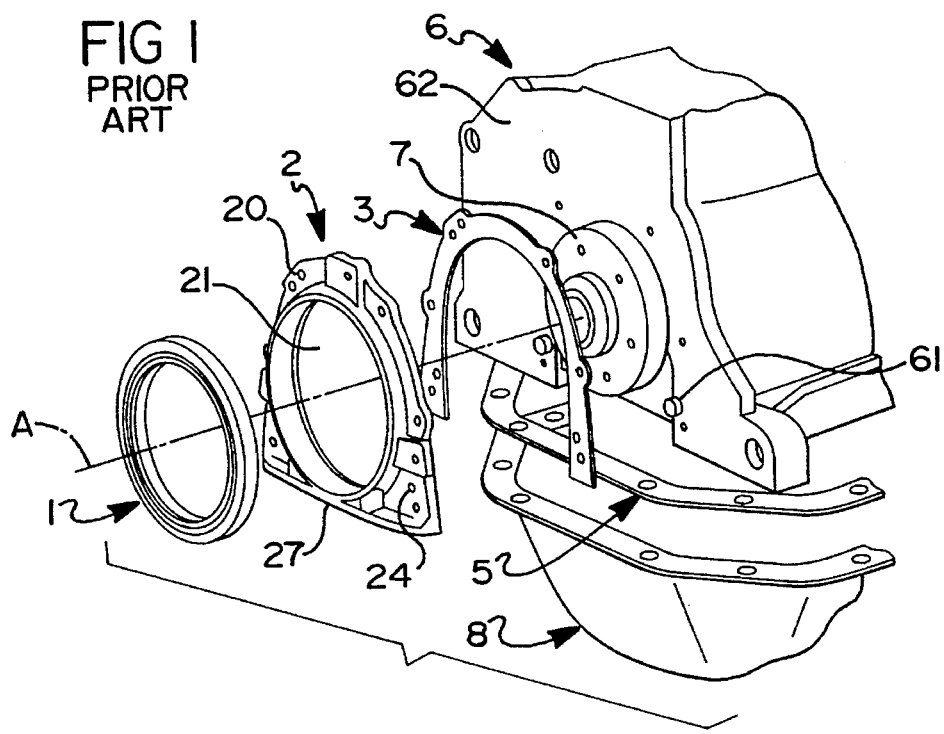
FIG. 1 An exploded view of a crankshaft seal according to the prior art.
Figure 2:
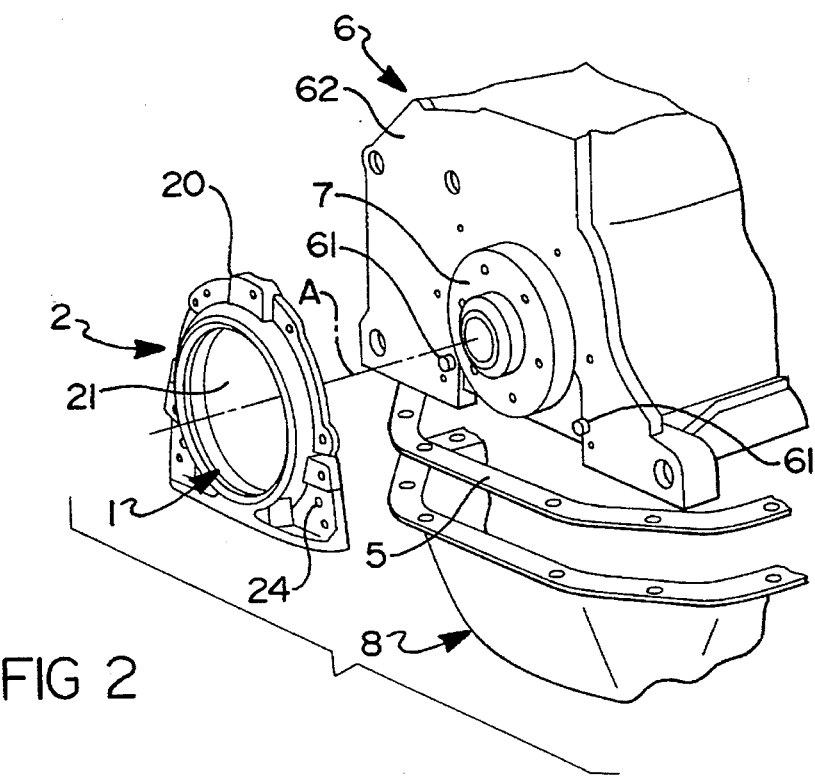
FIG. 2 An exploded view of a crankshaft seal with a gasket receptacle prefabricated according to the method of the invention.

The shaft seal 2 is prefabricated in a manner to be described hereinafter using an aluminium pressure die casting 20 corresponding to the prior art part 20 in FIG. 1 so as to constitute a "gasket module" together with a dynamic shaft seal ring 1 and a static gasket 10. The static gasket 10 is not visible in FIG. 2, because it is preassembled on the side of the die casting 20 facing the end face of the crankcase 6. The flat gasket 3 of FIG 1 is omitted. As in the prior art according to FIG. 1 the gasket receptacle 2 is fixed by fitting bores 24 and fitting pins 61 to the end face 62 of the crankcase 6. In the assembled state the crankshaft 7 with the axis A projects through the passage opening 21 for connection e.g. to a gear.

The static gasket 10 and the dynamic shaft seal ring 1 are moulded from the same side of the casting 20, namely from the side remote from the crankcase 6, by a multiple cavity die having a single casting unit and in a single operation, as shown in FIG. 3. The not shown moulding tool is centred in a conical face 25 of the die casting 20 with respect to the axis A. The moulding of the static gasket takes place by a moulding point 11 through a passage bore 23 in the upper portion of the casting 20, whilst the simultaneous moulding of the dynamic shaft seal ring 1 takes place by a shield 130 with a central moulding point 13, so that the shaft seal ring 1 is connected by means of webs 101, 102 on both sides to a radially inwardly projecting flange 29 of the casting 20, as shown in FIG. 4. FIG. 4 also shows the construction of the shaft seal ring 1 with the conventional sealing lip, which is pressed by a worm spring 104 onto the not shown shaft, as well as a protectivel lip 105. In the embodiment according to FIG. 3 moulding takes place from the sealing lip side, but could also take place from the protective lip side.

The right-hand gasket web 102 in FIG. 4 terminates below a sealing strip shaped onto the casting 20 or pressing rib 28, which on closing the not shown moulding tool is plastically deformed, so as to prevent any outflow of elastomeric moulding material during the moulding process.

In an alternative, shown in FIG. 4A, the pressing rib 28 is fitted further towards the top on the die casting 20 and the web 102 of the shaft seal ring 1 is drawn upwards to the pressing rib.

Figure 11:
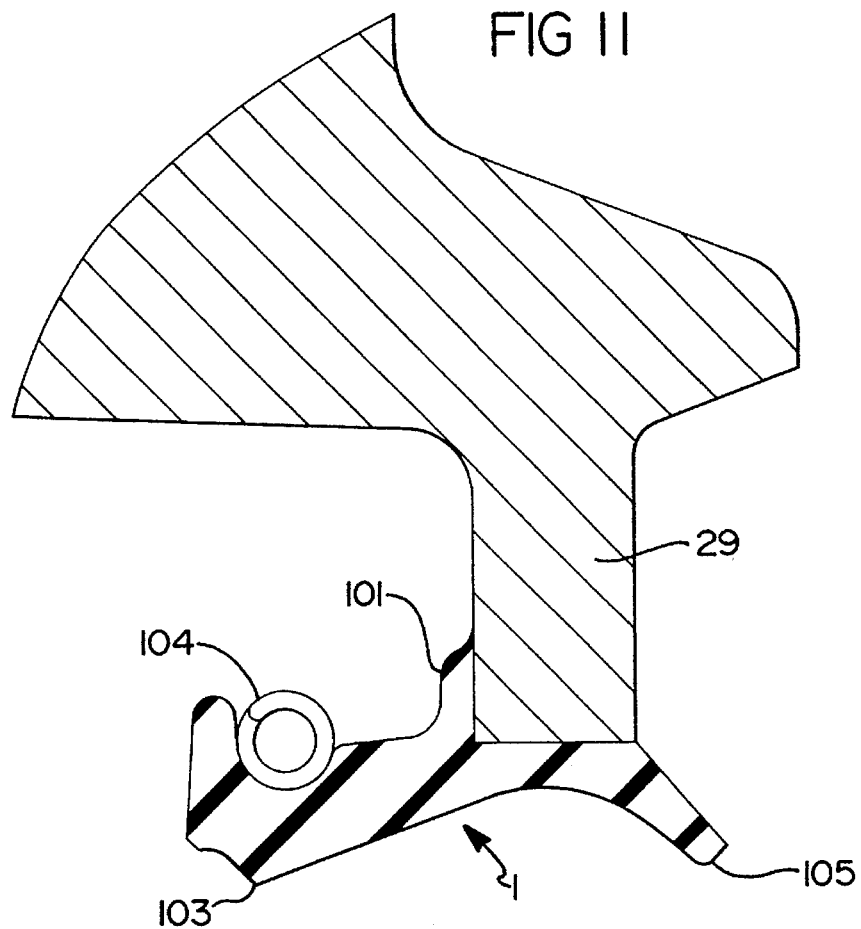
FIG. 11 An alternative construction for the fitting of the shaft seal ring to the gasket receptacle.

In a further alternative according to FIG. 11 the shaft seal ring 1 is only fastened on one side with a web 101 to the die casting flange 29, which further reduces manufacturing costs.

Figure 5:
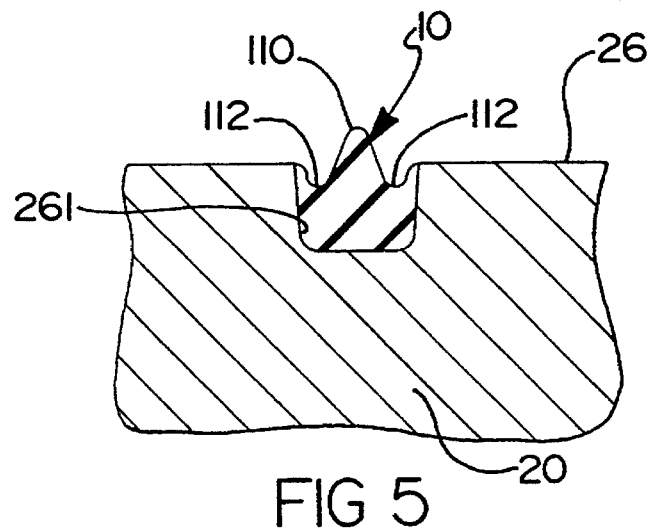
FIG. 5 A partial section along line V—V in FIG. 3 through the static gasket.

FIG. 5 shows the construction of the static gasket in the vicinity of the face 26 of the casting 20 facing the crankcase 6. It can be seen that the static gasket is received in a groove 261 which is common to face 26 and lower face 27 and, which has two side walls in the indicated area. One side wall faces face 22 and the other side wall faces lower ace 27. The sealing edge of the static gasket 10 has a wavy construction, so that during assembly the sealing material of the sealing edge 110 projecting over the surface is displaced into the depressions or troughs 112.

Figure 9:
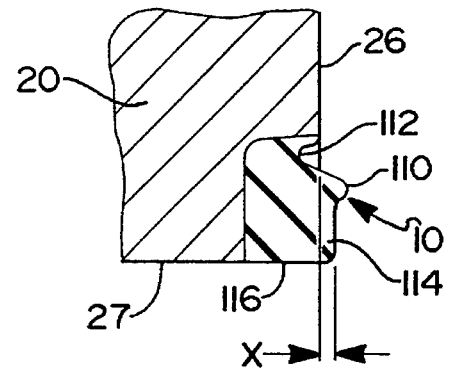
FIG. 9 A section to show the design of the static gasket in the vicinity of the oil sump seal in the unassembled state.
Figure 10:
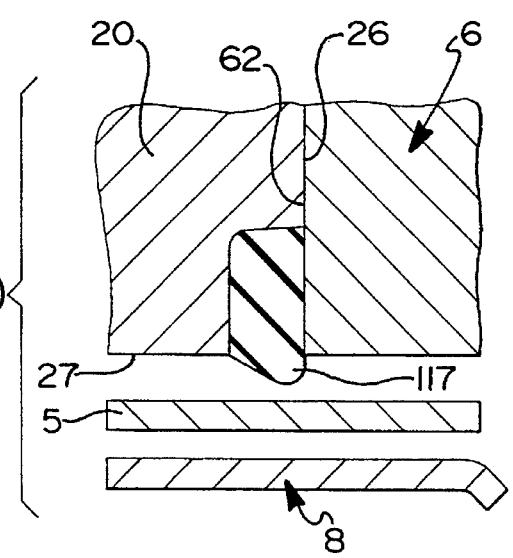
FIG. 10 The construction according to FIG. 9 in the state assembled on the crankcase, but prior to the final assembly of the oil sump and oil sump seal.

FIGS. 9 and 10 show the construction of the static gasket 10 adjacent to the lower face 27 of the casting 20 directed towards the oil sump 8. At this point the groove 261 is open to the lower side and consequently only has an upper side wall. The sealing edge 110 is not bordered on both sides by a depression, as in FIG. 5, but instead this only takes place on the upper side. On the lower side the static gasket 10 has a thickened portion 114, which projects by an amount x with respect to the face 26, whereas the underface 116 of the static gasket is flush with the face 27.

FIG. 9 shows these details with the gasket module 2 not yet assembled on the crankcase. However, FIG. 10 shows a situation in which the gasket module 2 is already assembled on the crankcase 6, but not on the oil sump 8. In this state the sealing edge 110 is pressed into the upper shaft part 112, so that the gasket surface is flush with the face 26 of the die casting 20, but the gasket 10 projects with a bead 117 from the underside of the face 27. On assembling the oil sump 8 with interposed oil sump gasket 5, this ensures a good sealing action, also in the vicinity of the shaft seal.

Figure 6:
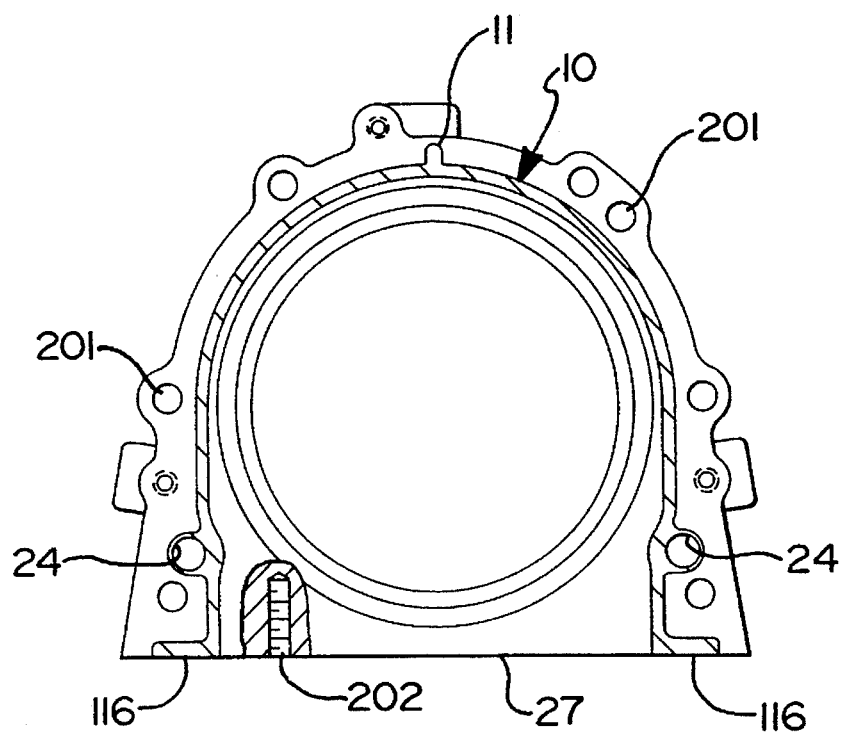
FIG. 6 A plan view of the shaft seal according to the invention in the direction of the static gasket.
Figure 7:
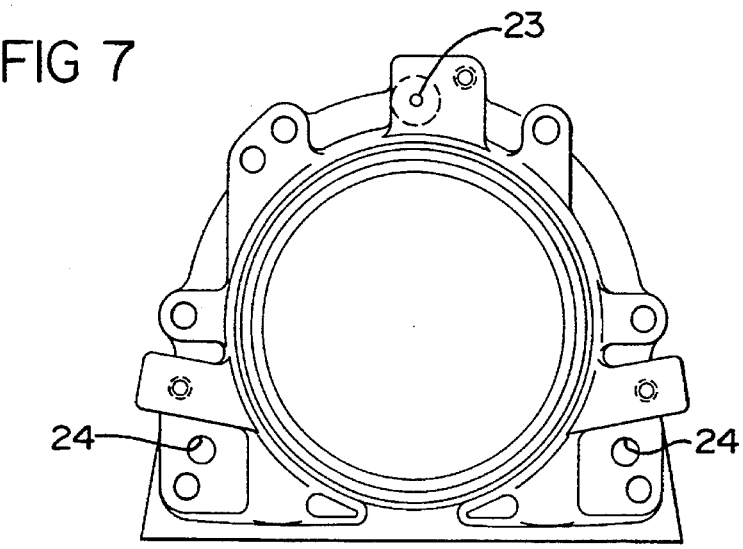
FIG. 7 A plan view of the shaft seal towards the not shown crankcase.
Figure 8:
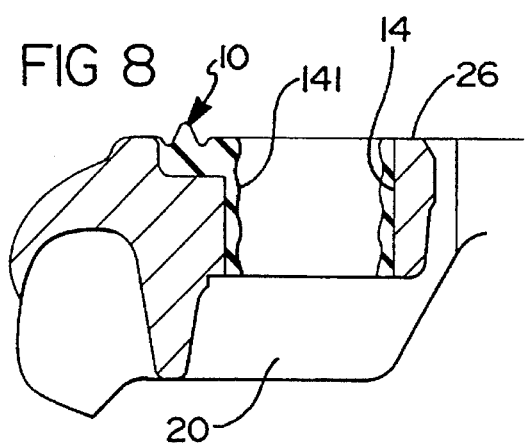
FIG. 8 A detail of the static gasket with a shaped on fitting bush.
Figure 12:
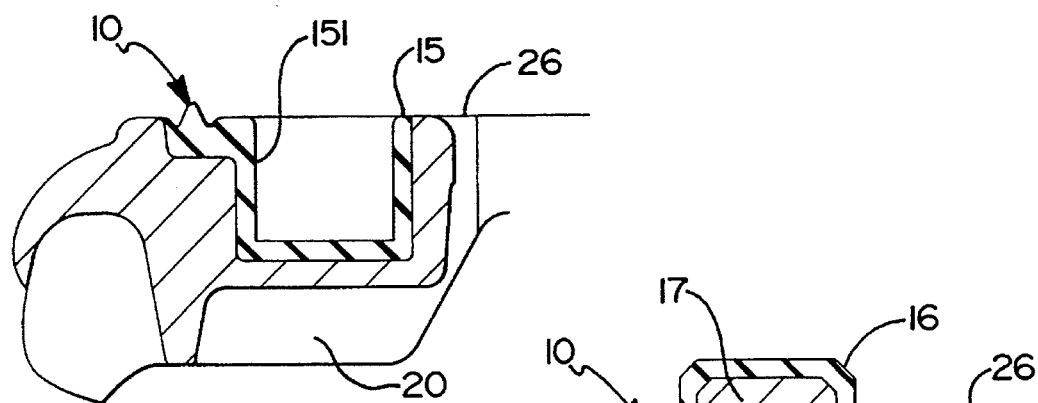
FIGS. 12 & 13 Alternatives for the construction of fitting elements on the static gasket.

In the plan view according to FIG. 6 the design of the static gasket with the runner point 11 and the areas 116 for engaging on the oil sump gasket 5 in the vicinity of the lower, machined face 27 of the casting 20 are clearly visible. Apart from the through holes 201 for the fixing screws for fixing to the crankcase 6, there are also fitting holes 24, which are lined with elastomer bushes 14 or 15 (cf. FIGS. 8 and 12) in one piece with the static gasket 10. These elastomer bushes are injected into the fitting holes 24 together with the static gasket. In FIG. 8 they have a wavy inner contour 141 and in FIG. 12 a smooth inner contour 151. To ensure that no air is enclosed in the blind hole according to FIG. 2 on engaging the shaft seal or the gasket module 2 on the fitting pins 61 on the crankcase 6, in the lining 15 there can be at least one axial groove by which air can escape during assembly.

FIG. 6 shows a tapped hole 202 for fixing the marginal flange of the oil sump 8 by means of screws.

In view of the limited shape and position tolerance which have to be respected for the fitting holes or bores 24, it is surprising that these tolerances can be maintained with the elastomer lining 14 or 15. One of the reasons for this is that in the not shown moulding tool, much finer tolerances are necessary than for the fitting bores 24, so that it is possible to very accurately maintain the position of the fitting bores relative to the axis A if, according to the invention, the moulding tool is guided on a conical surface 25, which extends at least partly over the inner circumference of the casting 20. Since, due to the resilience of the elastomer lining 14 or 15, the fitting bore 24 can be accurately adjusted to the diameter of the fitting pin 61 projecting away from the end face 62 of the crankcase 6, no significance is now attached to the tolerance of the bore diameter for the position of the crankshaft seal 2 with respect to the crankcase 6. Assembly tests have revealed the correctness of these ideas and made it clear that an adequately precise positioning within the requisite narrow tolerances can be obtained despite the apparently inadmissibly large tolerance of the bore diameter.

Figure 13:
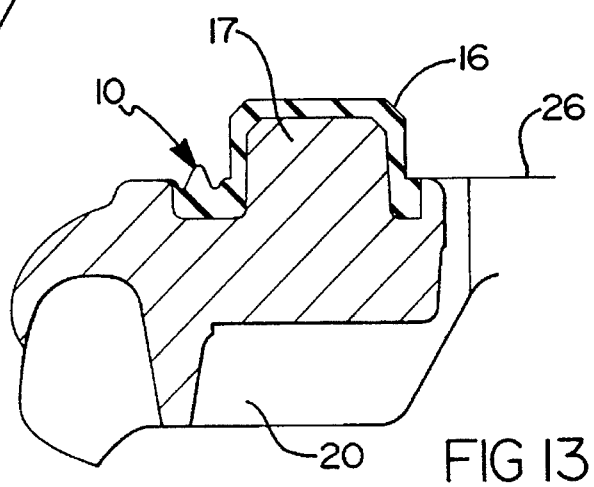

FIG. 13 shows a variant, where the lining of the bore is replaced by moulding an elastomer nipple 16 around a projecting pin 17 to the static gasket 10. During assembly the nipples 16 enter fitting bores provided on the crankcase 6.

For manufacturing the shaft seal only the face 27 is machined, in order to be able to respect the limited tolerance, not maintainable by die casting, of a few hundredths of a mm between the spacing of the axis A of the crankshaft and the underside of the crankcase (contact surface for the oil sump gasket 5 and the oil sump 8).

During the moulding of the gaskets 1, 10, the casting 20 is placed in the moulding tool and jammed when the latter is closed. As a result of the pressing ribs or sealing strips 28, which are plastically deformed on closing the moulding tool, the narrow tolerances necessary for the manufacture of the moulding tool can be respected, so that the tool can be closed all round, so that no elastomer material can pass out of the mould volume to be filled. Therefore the pressing ribs 28 act as tolerance compensators permitting a completely satisfactory sealing of the mould volume.

We claim:

1. A shaft seal assembly for a shaft extending out of a casing, said assembly comprising:

a gasket receptacle comprising a casing side face, and an under face arranged generally perpendicular to said casing side face, said casing side face and said under face having a common groove formed therein having side walls respectively facing said side face and said under face and said receptacle defining a passage opening for the shaft;

a dynamic shaft seal ring mounted on the receptacle and disposed in the passage opening of the receptacle;

a static elastomeric gasket molded separately from the shaft seal ring and on the casing side face of the receptacle and molded in said common groove, said static gasket projecting outwardly from said casing side face prior to mounting said seal assembly to said casing and said static gasket not projecting outwardly from said under face prior to mounting such that, upon mounting said seal assembly to said casing, said static gasket is deformed so as to move outwardly from said groove and project outwardly from said under face.

2. The assembly of claim 1, wherein said gasket receptacle further comprises a conical face portion.

3. The assembly of claim 1, wherein said gasket receptacle further comprises a bore for passage of elastomer during molding of said gasket.

\* \* \* \* \*